(12) United States Patent
Chang

(10) Patent No.: US 12,443,383 B2
(45) Date of Patent: Oct. 14, 2025

(54) DISPLAY SYSTEM AND METHOD FOR A VIDEO WALL WITH INTERFACE TO ALLOCATE PHYSICAL CONNECTION CONFIGURATION

(71) Applicant: Qisda Corporation, Taoyuan (TW)

(72) Inventor: Chih-Ming Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/403,834

(22) Filed: Jan. 4, 2024

(65) Prior Publication Data

US 2024/0241685 A1    Jul. 18, 2024

(30) Foreign Application Priority Data

Jan. 18, 2023   (CN) .......................... 202310060167.6

(51) Int. Cl.
```
G06F 3/14       (2006.01)
G06F 3/0486     (2013.01)
G06F 3/147      (2006.01)
G06F 12/02      (2006.01)
G06F 13/37      (2006.01)
```
(52) U.S. Cl.
CPC .......... *G06F 3/1446* (2013.01); *G06F 3/0486* (2013.01); *G06F 3/147* (2013.01); *G06F 12/0207* (2013.01); *G06F 13/37* (2013.01); *G09G 2300/026* (2013.01)

(58) Field of Classification Search
CPC .... G06F 13/37; G06F 12/0207; G06F 3/1446; G06F 3/0486; G06F 3/147; G09G 2300/026
See application file for complete search history.

(56) References Cited

U.S. PATENT DOCUMENTS

| | | | |
|---|---|---|---|
| 2015/0186099 A1* | 7/2015 | Hall .................... | G09G 3/2096 345/1.3 |
| 2015/0187333 A1* | 7/2015 | Loeffler ................ | G09G 5/008 345/1.3 |
| 2015/0286456 A1* | 10/2015 | Griffin .................. | G06F 3/1438 345/1.2 |
| 2017/0134690 A1* | 5/2017 | Masumoto ........... | G06F 3/1438 |
| 2020/0133615 A1* | 4/2020 | Kim ..................... | G06V 10/245 |
| 2021/0224017 A1* | 7/2021 | Choi .................... | G06K 7/1417 |
| 2023/0120557 A1* | 4/2023 | Khen .................. | G06F 3/04897 345/156 |
| 2023/0291961 A1* | 9/2023 | Doi ...................... | H04N 21/436 |
| 2024/0345792 A1* | 10/2024 | Li .......................... | G06F 3/1446 |

* cited by examiner

*Primary Examiner* — Liliana Cerullo

(57) ABSTRACT

An operation method is provided for a display system displaying a physical image comprising several physical sub-images. The display system comprises a display wall having several display modules for displaying physical sub-images and a control interface having a first display region and a second display region. The operation method comprises following steps. Displaying several virtual block images on the first display region. Displaying several display module connection images on the second display region. Dragging the virtual block images from the first display region to the second display region corresponding to the display module connection images. Wherein the physical connection configuration for the display modules is arranged according to the corresponding relationship between the virtual block images and the display module connection images.

26 Claims, 12 Drawing Sheets

FIG. 4B

| | col1 | col2 | col3 | col4 | col5 | col6 | col7 | col8 |
|---|---|---|---|---|---|---|---|---|
| row8 | X1Y8 | X2Y8 | X3Y8 | X4Y8 | X5Y8 | X6Y8 | X7Y8 | X8Y8 |
| row7 | X1Y7 | X2Y7 | X3Y7 | X4Y7 | X5Y7 | X6Y7 | X7Y7 | X8Y7 |
| row6 | X1Y6 | X2Y6 | X3Y6 | X4Y6 | X5Y6 | X6Y6 | X7Y6 | X8Y6 |
| row5 | X1Y5 | X2Y5 | X3Y5 | X4Y5 | X5Y5 | X6Y5 | X7Y5 | X8Y5 |
| row4 | X1Y4 | X2Y4 | X3Y4 | X4Y4 | X5Y4 | X6Y4 | X7Y4 | X8Y4 |
| row3 | X1Y3 | X2Y3 | X3Y3 | X4Y3 | X5Y3 | X6Y3 | X7Y3 | X8Y3 |
| row2 | X1Y2 | X2Y2 | X3Y2 | X4Y2 | X5Y2 | X6Y2 | X7Y2 | X8Y2 |
| row1 | X1Y1 | X2Y1 | X3Y1 | X4Y1 | X5Y1 | X6Y1 | X7Y1 | X8Y1 |

31

VB(8,8) at X8Y8; VB(i,j) at X6Y5; VB(1,1) at X1Y1; 10(1,8) at X1Y8

DISPLAY SYSTEM AND METHOD FOR A VIDEO WALL WITH INTERFACE TO ALLOCATE PHYSICAL CONNECTION CONFIGURATION

This application claims the benefit of People's Republic of China application Serial No. 202310060167.6, filed Jan. 18, 2023, the subject matter of which is incorporated herein by reference.

TECHNICAL FIELD

The present disclosure relates to a display system and an operation method thereof, in particular, relates to a display system having a display wall with a plurality of display modules the operation method thereof.

BACKGROUND

With the evolution of the manufacturing process of display panels, large-sized display panels have been widely used in various occasions. For example, a panel TV for home use has adopted a display panel of more than 60 inches. In addition, in occasions with a wider space (for example: stores, exhibition halls or outdoor plazas), there may be a demand for larger sizes. Multiple display modules may be stitched as a larger display wall to meet the requirements of wide space occasions.

Multiple display modules are stitched as a display wall, wherein each display module may have different hardware characteristics and parameters (for example: different resolutions), and errors may occur during stitching and installation of the display modules. Therefore, in the stitching and installation process of display modules, a more flexible allocating mechanism is needed so that each display module has an optimal physical connection configuration. Moreover, a more user-friendly control interface is required to facilitate the user to allocate the physical connection configuration of the display module simply and quickly.

For the physical connection configuration of the display modules of the display wall, those skilled in the art devote to develop a better configuration mechanism and control interface.

SUMMARY

According to an aspect of the present disclosure, a display system is provided. The display system is used for displaying a physical image, the physical image comprises a plurality of physical segmentation images, the display system comprising the following elements. A display wall, comprising a plurality of display modules, the display modules are used to correspondingly display the physical segmentation images, the display modules have a physical connection configuration in the display wall, and the physical connection configuration is related to a physical address of each of the display modules. A host controller, coupled to the display wall, and used to allocate the physical connection configuration of the display modules. A processing device, coupled to the host controller, the processing device comprising a control interface, comprising a first display region and a second display region, the first display region is used to display a plurality of virtual block images, the second display region is used to display a plurality of display module connection images, the virtual block images respectively correspond to the physical segmentation images, and the display module connection images respectively correspond to the display modules. The processing device is used to drag the virtual block images from the first display region to the second display region so as to correspond to the display module connection images, and the host controller is used to allocate the physical connection configuration of the display modules according to a relationship between the virtual block images and the display module connection images.

According to another aspect of the present disclosure, an operation method of a display system is provided. The display system is used to display a physical image, the physical image comprises a plurality of physical segmentation images, the display system comprises a display wall and a control interface, wherein the display wall comprises a plurality of display modules, the display modules are used to correspondingly display the physical segmentation images, the display modules have a physical connection configuration in the display wall, and the physical connection configuration is related to a physical address of each of the display modules, and the control interface comprises a first display region and a second display region, the operation method comprises the following steps. Displaying a plurality of virtual block images in the first display region, the virtual block images respectively correspond to the physical segmentation images. Displaying a plurality of display module connection images in the second display region, the display module connection images respectively correspond to the display modules. Dragging the virtual block images from the first display region to the second display region so as to correspond to the display module connection images. Allocating the physical connection configuration of the display modules according to a relationship between the virtual block images and the display module connection images.

BRIEF DESCRIPTION OF THE DRAWINGS

FIG. 4B is a schematic diagram of the first display region of the control interface in FIG. 4A.

Figure 1:
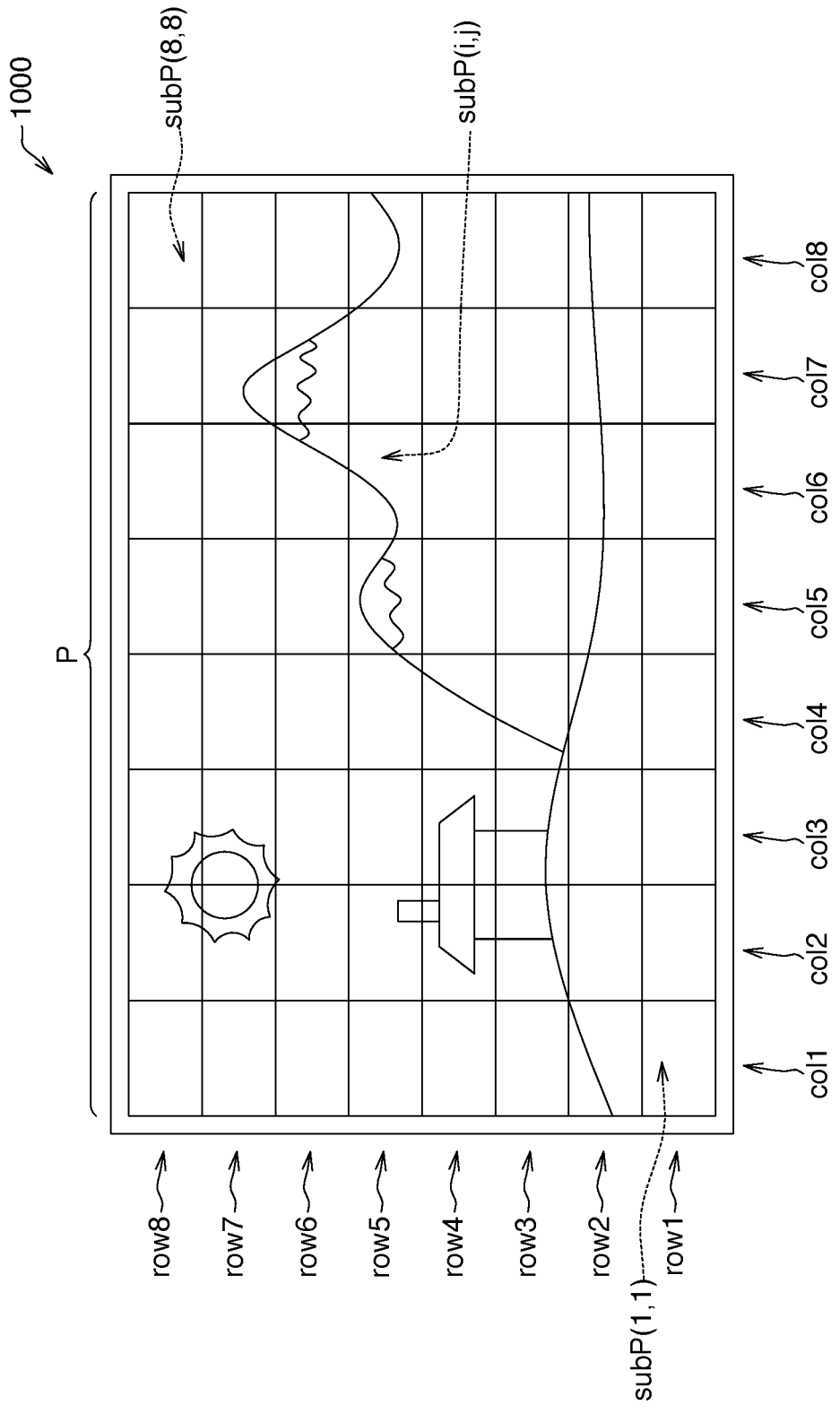
FIG. 1 is a schematic diagram of a front view of a display system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1 is a schematic diagram of a front view of a display system 1000 according to an embodiment of the present disclosure. Referring to FIG. 1, the display system 1000 is used for displaying a large-sized physical image P, and the physical image P includes a plurality of physical segmentation images subP(i,j). The display system 1000 realizes the display of the large-sized physical image P by stitching the physical segmentation images subP(i,j).

The physical image P has a first resolution Def1. The display system 1000 of this embodiment has, for example, a resolution of 4K, and the first resolution Def1 of the physical image P is 3840×2160. On the other hand, each physical segmentation image subP(i,j) has a second resolution Def2, and the second resolution Def2 in this embodiment is, for example, 480×270. The total amount of the physical segmentation images subP(i,j) is a first amount N1, and the first amount N1 is equal to the first resolution Def1 divided by the second resolution Def2. In this embodiment, the first amount N1 is 64, and the physical image P includes 64 physical segmentation images subP(1,1)-subP(8,8). The physical segmentation images subP(1,1)-subP(8,8) are arranged as 8 horizontal rows row1-row8 and 8 vertical columns col1-col8.

Figure 2:
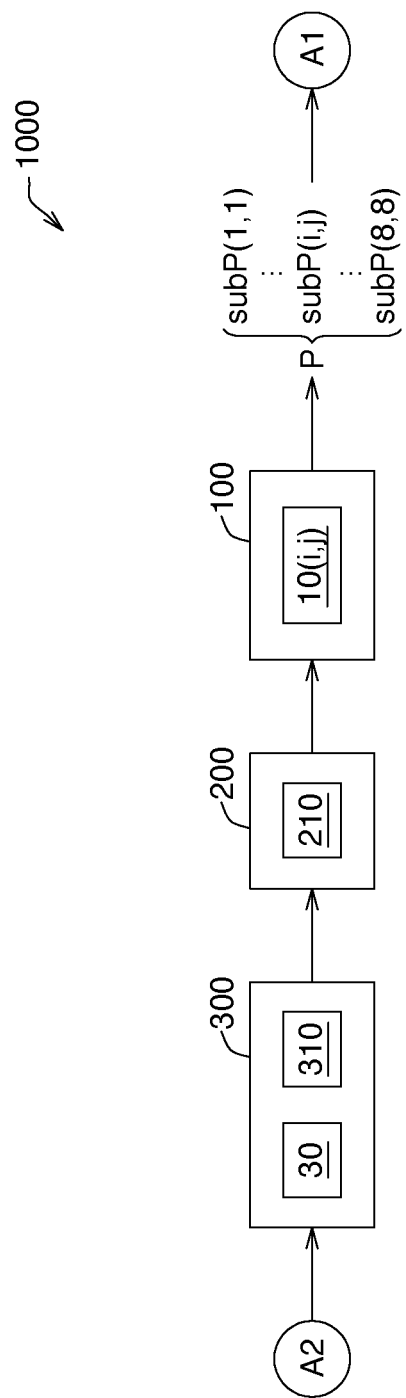
FIG. 2 is a block diagram of a display system according to an embodiment of the present disclosure.

FIG. 2 is a block diagram of a display system 1000 according to an embodiment of the present disclosure. Referring to FIG. 2, the display system 1000 includes a display wall 100, a host controller 200 and a processing device 300.

The display wall 100 serves as an output terminal of the display system 1000, and the display wall 100 is used to display the physical image P. The display wall 100 includes a plurality of display modules 10(i,j), and these display modules 10(i,j) are used for correspondingly displaying the physical segmentation image subP(i,j). The first user A1 is, for example, a viewer in the application field of the display system 1000 (which may be referred to as "front end"). The first user A1 may watch the physical image P composed of the physical segmentation image subP(i,j) at the front end of the display system 1000.

The host controller 200 is coupled to the display wall 100. The host controller 200 is used to allocate the physical connection configuration of the display module 10(i,j) in the display wall 100, so as to control the display module 10(i,j) to adaptively display the physical segmentation image subP(i,j). The host controller 200 includes a storage circuit 210 for storing related parameters of the physical connection configuration of the display module 10(i,j). The host controller 200 further includes a microcontroller (MCU) and a field programmable gate array (FPGA) (not shown in FIG. 2), and the microcontroller and the field programmable gate array are used to execute the allocation of the physical connection configuration of display module 10(i,j).

The processing device 300 is coupled to the host controller 200. The processing device 300 is a user terminal computing device, such as a personal computer (including a desktop computer or a notebook computer) or a mobile device (including a mobile phone or a tablet computer). The processing device 300 has a control interface 30, and the control interface 30 may display a plurality of virtual block images VB(i,j), and these virtual block images VB(i,j) respectively correspond to the physical segmentation images subP(i,j). The second user A2 is, for example, an engineer at the control end (referred to as "back end") of the display system 1000. The second user A2 may issue commands at the back end through the control interface 30 of the processing device 300, so as to set and control the display system 1000. The processing device 300 further includes a storage circuit 310 for storing related parameters of the virtual block image VB(i,j).

Figure 3A:
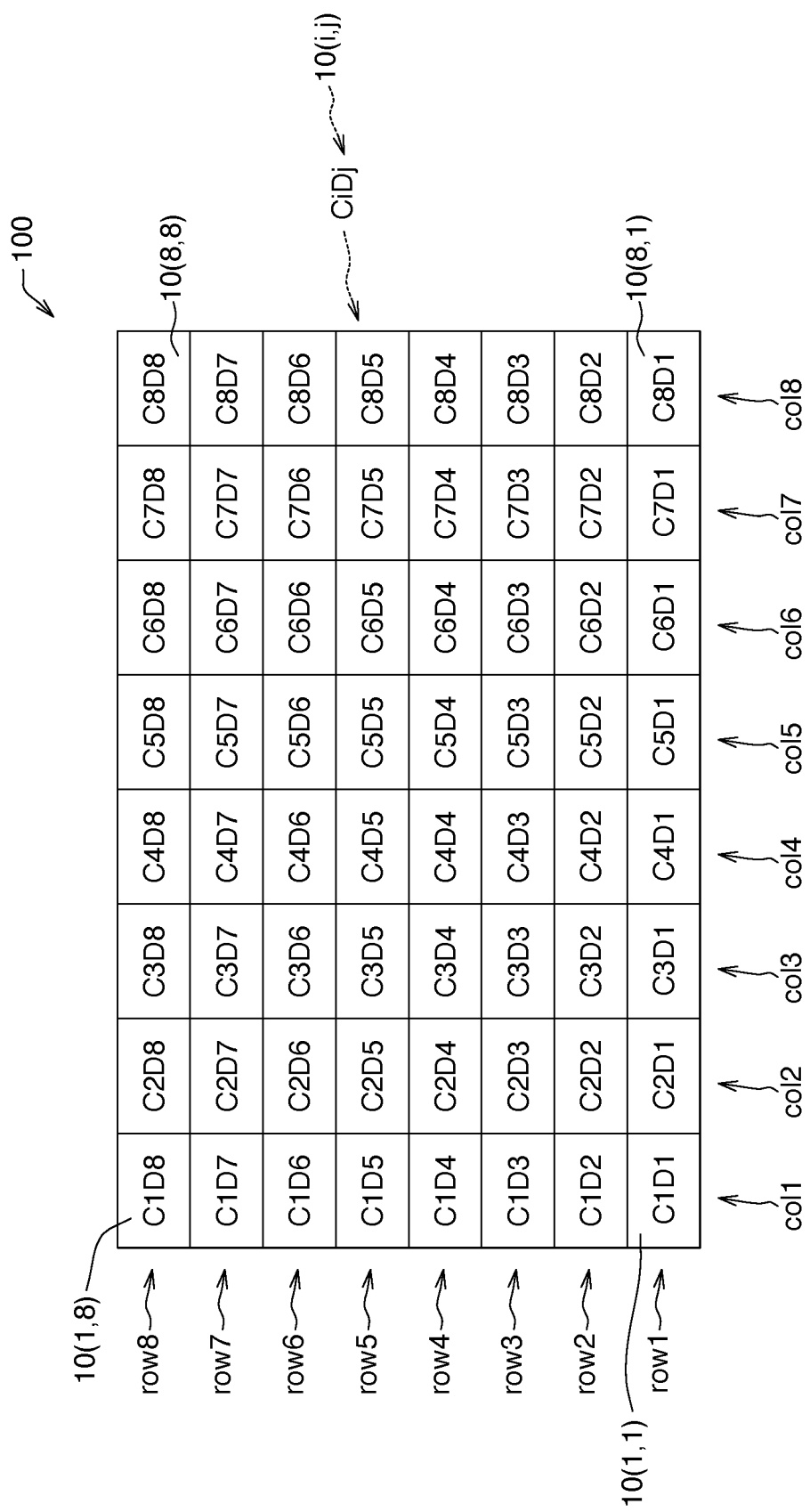
FIG. 3A is a schematic diagram of a front view of the display wall of the display system.

FIG. 3A is a schematic diagram of a front view of the display wall 100 of the display system 1000. Referring to FIG. 3A, the display wall 100 is a direct view LED wall. The display wall 100 includes a plurality of display modules 10(i,j), and each of the display modules 10(i,j) is, for example, an LED cabinet. Each display module 10(i, j) is composed of a plurality of LED cells, and each LED cell is composed of a plurality of LED packages. These display modules 10(i,j) are stitched as the display wall 100.

These display modules 10(i,j) are used for correspondingly displaying the physical segmentation image subP(i,j) shown in FIG. 1. Each display module 10(i,j) has a second resolution Def2 (for example, 480×270). The amount of display modules 10(i,j) is equal to the amount of physical segmentation images subP(i,j), that is, the amount of display modules 10(i,j) is equal to the first amount N1 (for example, 64). The display wall 100 includes 64 display modules 10(1,1)-10(8,8) which are arranged as 8 horizontal rows row1-row8 and 8 vertical columns col1-col8. For example, the display module 10(1,1) is disposed at a position of the first horizontal row row1 and the first vertical column col1 of the display wall 100, and the display module 10(1,1) correspondingly displays the physical segmentation image subP(1,1). The display module 10(8,8) is disposed at a position of the eighth horizontal row row8 and the eighth vertical column col8 of the display wall 100, and the display module 10(8,8) correspondingly displays the physical segmentation image subP(8,8).

Each display module 10(i,j) has a corresponding physical address CiDj in the display wall 100. For example, the display module 10(1,1) has a physical address C1D1, and the display module 10(8,8) has a physical address C8D8. The physical address CiDj of the display module 10(i,j) reflects the physical connection configuration of the display module 10(i,j).

Figure 3B:
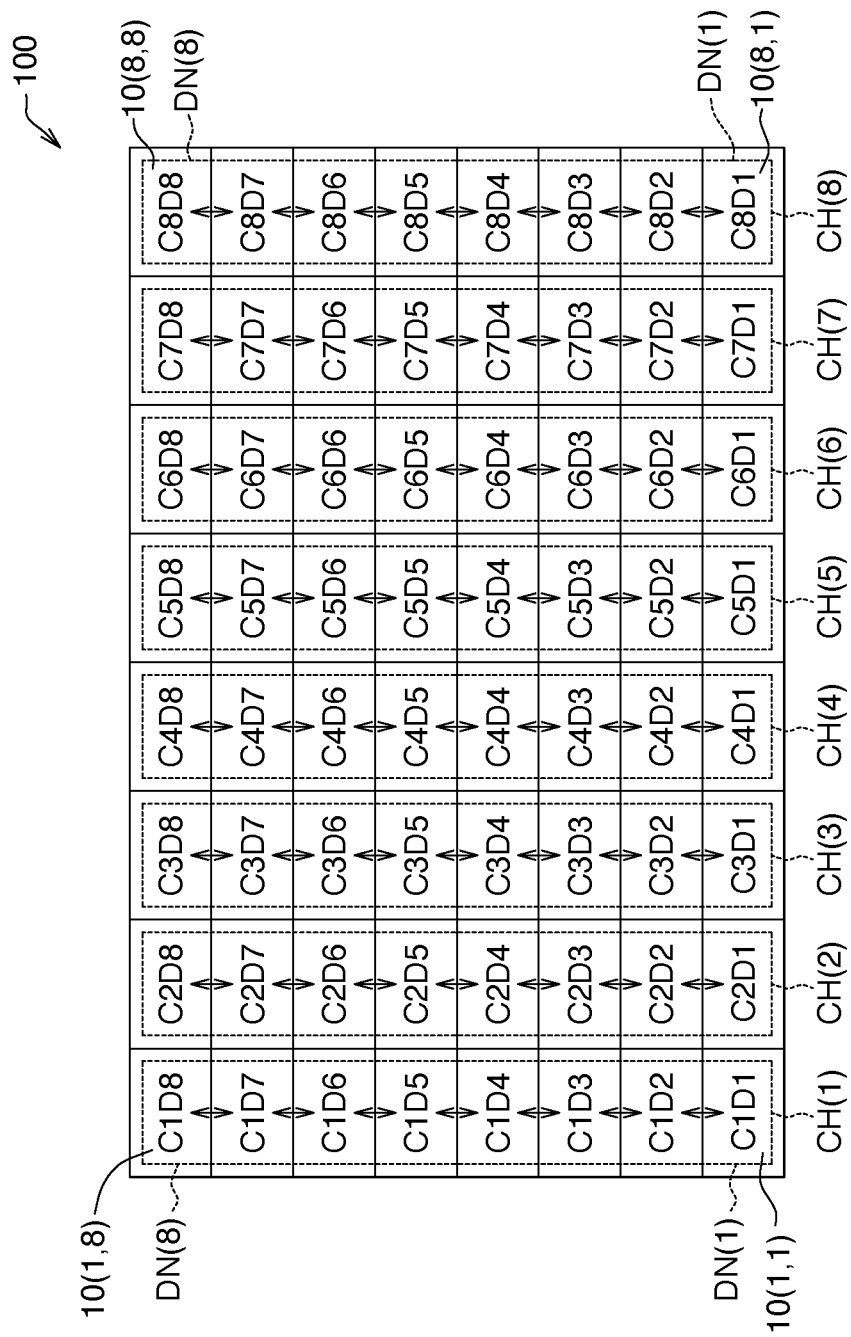
FIG. 3B is a schematic diagram of the physical connection configuration of the display modules of the display wall.

FIG. 3B is a schematic diagram of the physical connection configuration of the display modules 10(i,j) of the display wall 100. Referring to FIG. 3B, the physical connection configuration of the 64 display modules 10(1,1)-10(8,8) of the display wall 100 is, for example, a "daisy chain" configuration. The daisy chain configuration includes 8 chain channels Ch(1)-CH(8). And, each of the chain channels CH(1)-CH(8) comprises a plurality of chain nodes DN(j). In one example, each of the chain channels CH(1)-CH(8) includes the same amount of chain nodes DN(j), and each of the chain channels CH(1)-CH(8) includes 8 chain nodes DN(1)-DN(8). In another example, the chain channels CH(1)-CH(8) include different amounts of chain nodes DN(j) in a non-symmetric (i.e., asymmetric) connection configuration.

Display modules 10(1,1)-10(1,8) belong to the first chain channel CH(1), wherein, display module 10(1,1) corresponds to chain node DN(1) of the chain channel CH(1), where chain channel CH(1) has chain channel code C1, and chain node DN(1) has chain node code D1. The physical address C1D1 of the display module 10(1,1) is related to the chain channel code C1 and the chain node code D1 of the daisy chain configuration, that is, the physical address C1 D1 is composed of the chain channel code C1 and the chain node code D1.

Similarly, the display module 10(1,8) corresponds to the chain node DN(8) of the chain channel CH(1). The physical address C1D8 of the display module 10(1,8) is related to the chain channel code C1 of the chain channel CH(1) and the chain node code D8 of the chain node DN(8).

Two display modules 10($i,j$) and 10($i,j$+1) corresponding to two adjacent chain nodes DN(j) and DN(j+1) in the same chain channel CH(i) have a connection relationship of an uplink connection or a downlink connection. The display module 10($i,j$) is connected to the display module 10($i,j$+1) via an uplink connection circuit. Or, in another aspect, the display module 10($i,j$+1) is connected to the display module 10($i,j$) via a downlink connection circuit.

The host controller 200 may analyze the physical connection configuration of the display module 10($i,j$) in the display wall 100, so as to generate the physical address CiDj of the display module 10($i,j$). These physical addresses CiDj may be stored in the storage circuit 210 of the host controller 200 shown in FIG. 2.

Figure 4A:
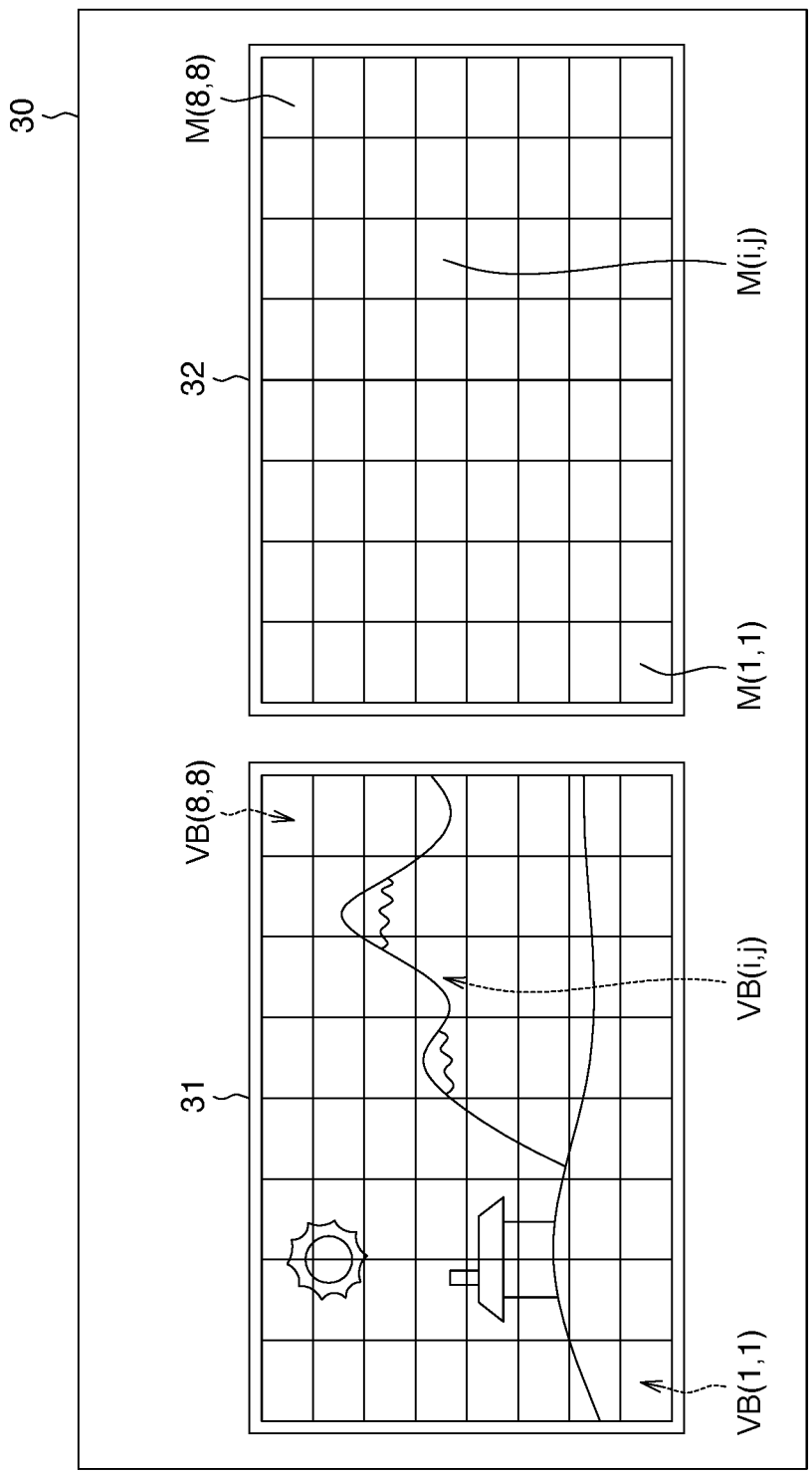
FIG. 4A is a schematic diagram of the control interface of the processing device.

FIG. 4A is a schematic diagram of the control interface 30 of the processing device 300. Referring to FIG. 4A, the control interface 30 is, for example, a graphical user interface (GUI). The control interface 30 includes a first display region 31 and a second display region 32. The first display region 31 is used to display a plurality of virtual block images VB(1,1)-VB(8,8). The second display region 32 is used for displaying a plurality of display module connection images M(1,1)-M(8,8).

When the second user A2 at the back end of the display system 1000 operates the display system 1000, the second user A2 may watch the virtual block images VB(1,1)-VB(8) through the control interface 30 of the processing device 300 and display module connection images M(1,1)-M(8,8). The virtual block images VB(1,1)-VB(8,8) correspond to the physical segmentation images subP(1,1)-subP(8,8) displayed on the display wall 100. Moreover, the display module connection images M(1,1)-M(8,8) correspond to the display modules 10(1,1)-10(8,8) of the display wall 100. The second user A2 watching the virtual block images VB(1,1)-VB(8,8) on the control interface 30 is equivalent to the first user A1 watching the physical segmentation images subP(1,1)-subP(8,8) on the display wall 100(8,8).

FIG. 4B is a schematic diagram of the first display region 31 of the control interface 30 in FIG. 4A. Referring to FIG. 4B, the virtual block images VB(1,1)-VB(8,8) are displayed in the first display region 31, and the virtual block images VB(1,1)-VB(8,8) respectively correspond to the physical segmentation images subP(1,1)-subP(8,8) shown in FIG. 1.

Each of the virtual block images VB(1,1)-VB(8,8) has a second resolution Def2 (for example, 480×270). The amount of virtual block images VB(1,1)-VB(8,8) is equal to the amount of physical segmentation images subP(1,1)-subP(8,8), that is, the amount of the virtual block images VB(1,1)-VB(8,8) is equal to the first amount N1 (for example, 64). The 64 virtual block images VB(1,1)-VB(8,8) are arranged as 8 horizontal rows row1-row8 and 8 vertical columns col1-col8.

The virtual block image VB(i,j) displayed at a position of the i-th vertical column coli and the j-th horizontal row rowj in the first display region 31 has a column code Xi and a row code Yj. For example, the virtual block image VB(1,1) has a column code X1 and a row code Y1, and the virtual block image VB(8,8) has a column code X8 and a row code Y8.

Furthermore, the virtual block image VB(i,j) has a division address XiYi. The division address XiYi is related to the column code Xi and the row code Yj of the virtual block image VB(i,j), that is, the division address XiYi is composed of the column code Xi and the row code Yj. For example, the virtual block image VB(1,1) has a division address X1Y1, which is composed of a column code X1 and a row code Y1. The virtual block image VB(8,8) has a division address X8Y8 and is composed of a column code X8 and a row code Y8.

The above information of the division address XiYj may be stored in the storage circuit 310 of the processing device 300 shown in FIG. 2 and may be stored in the storage circuit 210 of the host controller 200 synchronously. For example, the division address XiYj may be encoded into a division address code word having multiple bits, and the division address code word is stored in the register in the storage circuit 310.

In this embodiment, the first display region 31 totally displays 64 virtual block images VB(1,1)-VB(8,8), which are arranged as 8 horizontal rows row1-row8 and 8 vertical columns col1-col8, therefore, the range of division address XiYi is: X1Y1-X8Y8. Within the range of X1Y1-X8Y8, the division address XiYj may be encoded as an 8-bit division address code word (b7, b6, b5, b4, b3, b2, b1, b0). The relationship between division address XiYj and division address code words (b7, b6, b5, b4, b3, b2, b1, b0) is shown in Table 1-1 and Table 1-2:

TABLE 1-1

| (b3, b2, b1, b0) | Yi |
|---|---|
| (0, 0, 0, 0) | (reserved) |
| (0, 0, 0, 1) | Y1 |
| (0, 0, 1, 0) | Y2 |
| (0, 0, 1, 1) | Y3 |
| (0, 1, 0, 0) | Y4 |
| (0, 1, 0, 1) | Y5 |
| (0, 1, 1, 0) | Y6 |
| (0, 1, 1, 1) | Y7 |
| (1, 0, 0, 0) | Y8 |
| (1, 0, 0, 1) | Y9(reserved) |
| (1, 0, 1, 0) | Y10(reserved) |
| (1, 0, 1, 1) | Y11(reserved) |
| (1, 1, 0, 0) | Y12(reserved) |
| (1, 1, 0, 1) | Y13(reserved) |
| (1, 1, 1, 0) | Y14(reserved) |
| (1, 1, 1, 1) | Y15(reserved) |

TABLE 1-2

| (b7, b6, b5, b4) | Xi |
|---|---|
| (0, 0, 0, 0) | (reserved) |
| (0, 0, 0, 1) | X1 |
| (0, 0, 1, 0) | X2 |
| (0, 0, 1, 1) | X3 |
| (0, 1, 0, 0) | X4 |
| (0, 1, 0, 1) | X5 |
| (0, 1, 1, 0) | X6 |
| (0, 1, 1, 1) | X7 |
| (1, 0, 0, 0) | X8 |
| (1, 0, 0, 1) | X9(reserved) |
| (1, 0, 1, 0) | X10(reserved) |
| (1, 0, 1, 1) | X11(reserved) |
| (1, 1, 0, 0) | X12(reserved) |
| (1, 1, 0, 1) | X13(reserved) |
| (1, 1, 1, 0) | X14(reserved) |
| (1, 1, 1, 1) | X15(reserved) |

Regarding the relationships in Table 1-1, the division address Y1 corresponds to the division address code word (b3, b2, b1, b0)=(0, 0, 0, 1), and the division address Y2 corresponds to the division address code word (b3, b2, b1, b0)=(0, 0, 1, 0), and so on, the division address Y8 corresponds to the division address code word (b3, b2, b1, b0)=(1, 0, 0, 0). On the other hand, outside the range of Y1 to Y8, the division address code word (b3, b2, b1, b0)=(0, 0, 0, 0) and the division address code word (b3, b2, b1, b0)=(1, 0, 0, 1)-(1, 1, 1, 1) are temporarily reserved.

Similarly, regarding the relationship of Table 1-2, the division address X1 corresponds to the division address code word (b7, b6, b5, b4)=(0, 0, 0, 1), and the division address X2 corresponds to the division address code word (b7, b6, b5, b4)=(0, 0, 1, 0), and so on, the division address X8 corresponds to the division address code word (b7, b6, b5, b4)=(1, 0, 0, 0).

From the above, the division address code word (b7, b6, b5, b4, b3, b2, b1, b0)=(0, 0, 0, 1, 0, 0, 0, 1) correspond to the division address X1Y1 of the virtual block image VB(1,1). And, the division address code word (b7, b6, b5, b4, b3, b2, b1, b0)=(1, 0, 0, 0, 1, 0, 0, 0) correspond to division address X8Y8 of virtual block image VB(8,8).

Figure 4C:
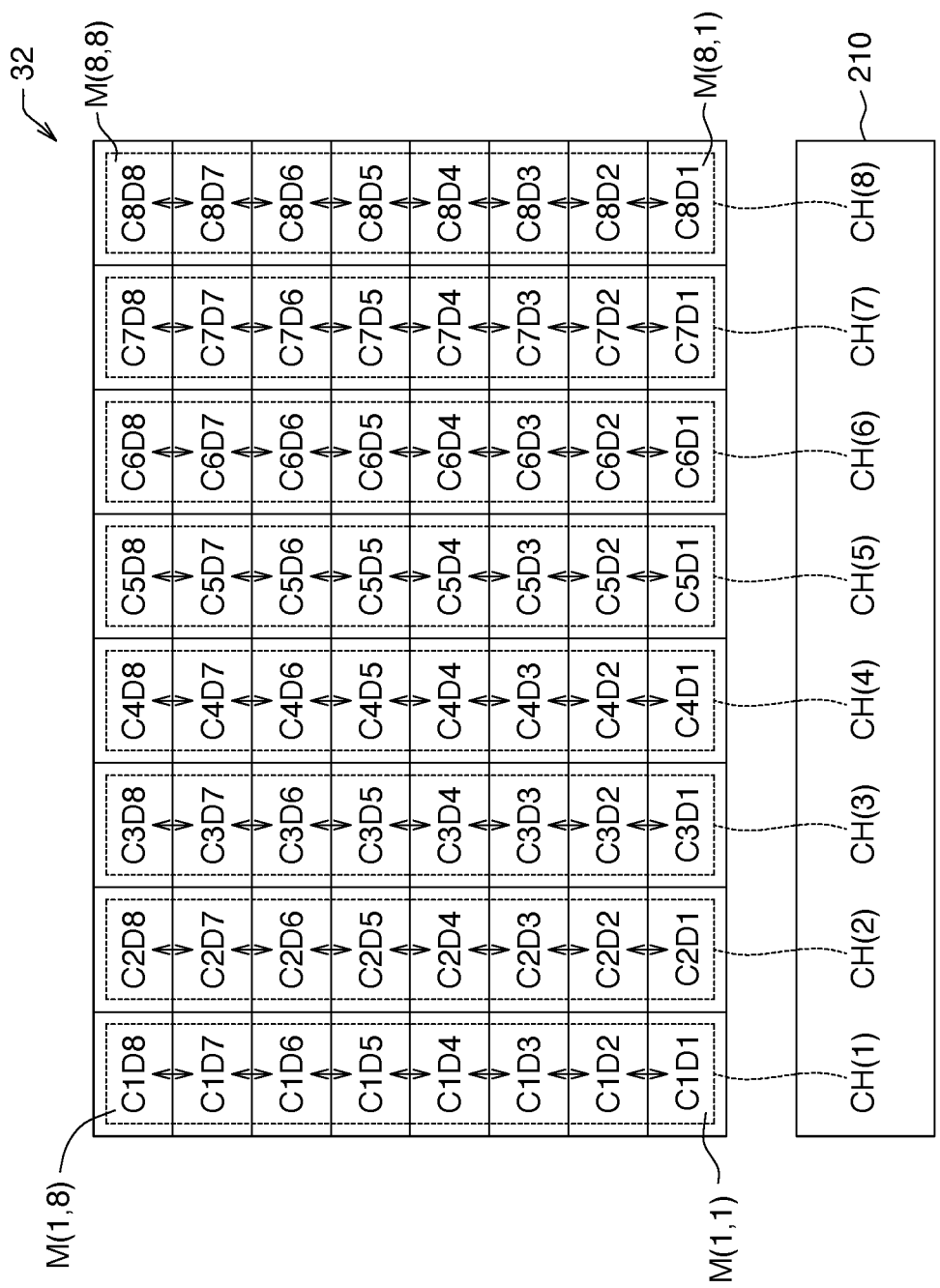
FIG. 4C is a schematic diagram of the second display region of the control interface in FIG. 4A.

FIG. 4C is a schematic diagram of the second display region 32 of the control interface 30 in FIG. 4A. Referring to FIG. 4C, the display module connection images M(1,1)-M(8,8) are displayed in the second display region 32, and the display module connection images M(1,1)-M(8,8) has an amount equal to the first amount N1 (for example, 64).

The display module connection images M(1,1)-M(8,8) respectively correspond to the display modules 10(1,1)-10(8,8) shown in FIG. 3B. For example, the display module connection image M(1,1) corresponds to the display module 10(1,1) with the physical address C1D1, and the display module connection image M(8,8) corresponds to the display module 10(8,8) with the physical address C8D8.

Similar to the daisy chain configuration of the display modules 10(1,1)-10(8,8) shown in FIG. 3B, the display module connection images M(1,1)-M(8,8) also have a daisy chain configuration. For example, the display module connection images M(1,1)-M(1,8) belong to the first chain channel CH(1), and the display module connection images M(8,1)-M(8,8) belong to The 8th chain channel CH(8).

Referring to FIG. 4A again, in operation, the second user A2 issues an instruction through the control interface 30, and in response to the instruction of the second user A2, the processing device 300 is configured to drag one or more of the virtual block image VB(1,1)-VB(8,8) from the first display region 31 of the control interface 30 to the second display region 32, and correspondingly place the virtual block image VB(1,1)-VB(8,8) on the corresponding position of one or more of the display module connection images M(1,1)-M(8,8). In one example, the control interface 30 is a touch screen, and the second user A2 may issue an instruction by sliding the control interface 30 with his hand, so as to drag the virtual block image VB(i,j) to the second display region 32 and correspondingly placed at the position of the display module connection image M(i, j). After the virtual block image VB(i,j) is placed at the position of the display module connection image M(i,j), the display module 10(i,j) of the display wall 100 may establish a mapping relationship with the virtual block image VB(i,j).

The mapping relationship between the display module 10(i,j) and the virtual block image VB(i,j) may be specifically expressed as: the mapping relation of the physical address CiDj of the display module 10(i,j) and division address code word (b7, b6, b5, b4, b3, b2, b1, b0) of the division address XiYj of virtual block image VB(i, j), which may be stored in the storage circuit 310 of the processing device 300. Table 2-1 lists mapping relationship of the physical address CiDj and division address code words (b7, b6, b5, b4, b3, b2, b1, b0) of display module 10(i,j). In this embodiment, the first chain channel CH(1) comprises 8 chain nodes DN(1)-DN(8), and the mapping relationship of Table 2-1 is stored in 8 registers in the storage circuit 310. When the second user A2 has not dragged the virtual block image VB(i,j) on the control interface 30, the mapping relationship has not been established, hence the division address code words (b7, b6, b5, b4, b3, b2, b1, b0) has a default value of (0, 0, 0, 0, 0, 0, 0, 0).

TABLE 2-1

| First chain channel CH(1) | | | |
|---|---|---|---|
| Chain node DN(j) | Physical address CiDj | Division address XiYj | Division address code word (b7, b6, b5, b4, b3, b2, b1, b0) |
| DN(1) | C1D1 | — | (0, 0, 0, 0, 0, 0, 0, 0) |
| DN(2) | C1D2 | — | (0, 0, 0, 0, 0, 0, 0, 0) |
| DN(3) | C1D3 | — | (0, 0, 0, 0, 0, 0, 0, 0) |
| DN(4) | C1D4 | — | (0, 0, 0, 0, 0, 0, 0, 0) |
| DN(5) | C1D5 | — | (0, 0, 0, 0, 0, 0, 0, 0) |
| DN(6) | C1D6 | — | (0, 0, 0, 0, 0, 0, 0, 0) |
| DN(7) | C1D7 | — | (0, 0, 0, 0, 0, 0, 0, 0) |
| DN(8) | C1D8 | — | (0, 0, 0, 0, 0, 0, 0, 0) |

After the second user A2 drags the virtual block image VB(i, j) to the second display region 32 and places it at the position corresponding to the display module connection image M(i,j), the display module 10 (i,j) has established a mapping relationship with the virtual block image VB(i,j), then update values of the division address code word (b7, b6,b5,b4,b3,b2,b1,b0) based on division address XiYj of virtual block image VB(I,j), as detailed below.

Figure 5A:
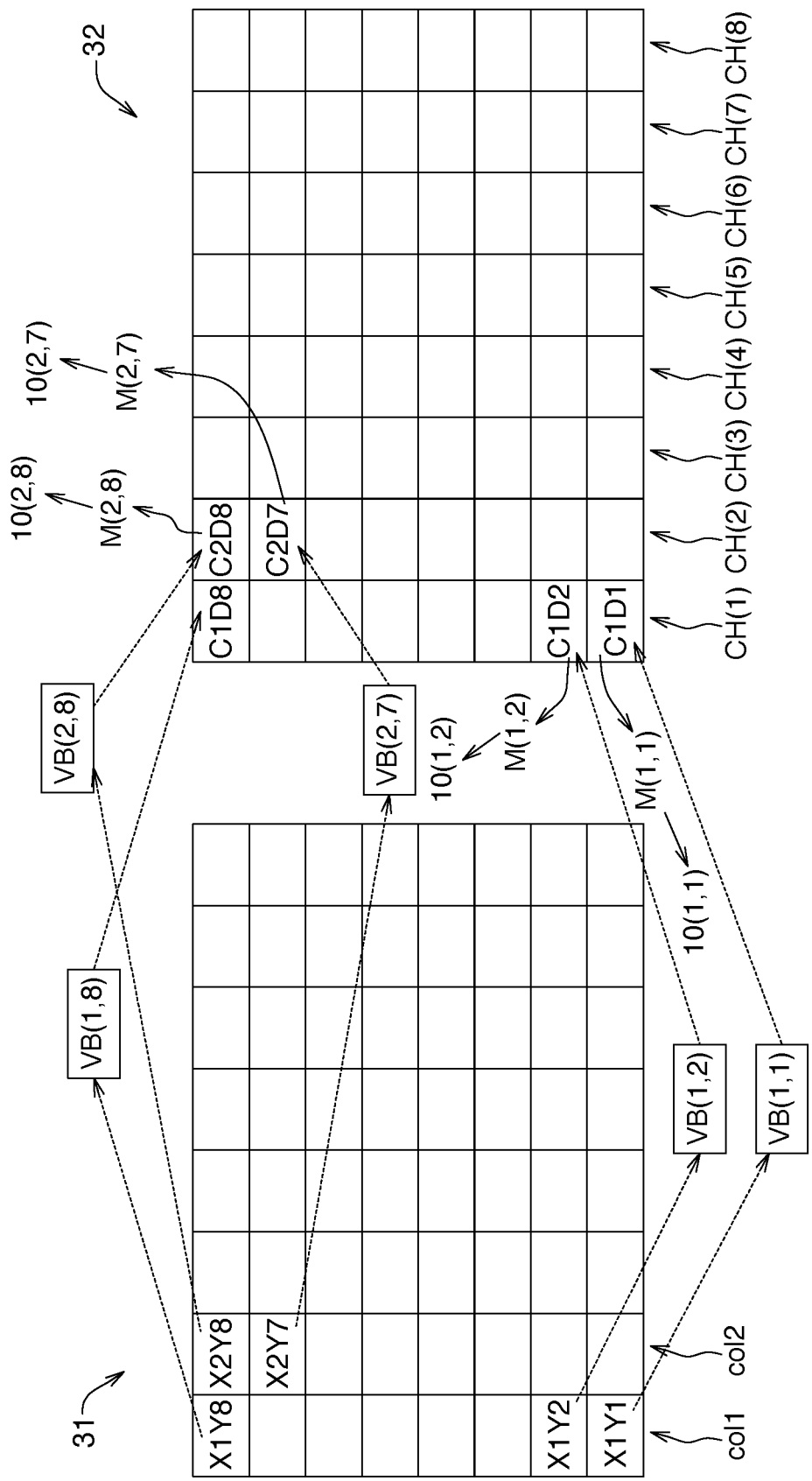
FIG. 5A is a schematic diagram showing an embodiment of dragging and placing the virtual block image of the first display region on the second display region.

FIG. 5A is a schematic diagram showing an embodiment of dragging and placing the virtual block image VB(i,j) of the first display region 31 on the second display region 32. When the second user A2 has not dragged any virtual block image VB(i,j) to the second display region 32, the default state of the second display region 32 is to display monochrome color (for example, display black color). That is, in the default state, all display module connection images M(i,j) are displayed in monochrome color, indicating that the display module 10(i,j) has not established a mapping relationship with the virtual block image VB(i,j), and the division address code words (b7, b6, b5, b4, b3, b2, b1, b0) stored in the register of the storage circuit 310 remain as the default value (0,0,0,0,0,0,0,0).

When the second user A2 drags one virtual block image VB(1,1) out of the first display region 31, the region of the division address X1Y1 in the first display region 31 which the virtual block image VB(1,1) was originally placed, is displayed as monochrome (for example, gray color). When the virtual block image VB(1,1) is dragged and correspondingly placed on the position of the display module connection image M(1,1) in the second display region 32 (for example, the virtual block image VB(1,1) overlaps the display module connection image M(1,1)), the display module connection image M(1,1) is replaced by the virtual block image VB(1,1). At this time, the display module 10(1,1) at the physical address C1D1 has established a mapping relationship with the virtual block image VB(1,1) at the division address X1Y1, and the physical address C1 D1 is mapped to division address code word (0,0,0,1,0,0,0,1) of division address X1Y1. The register of the storage circuit 310 is updated as Table 2-2:

TABLE 2-2

First chain channel CH(1)

| Chain node DN(j) | Physical address CiDj | Division address XiYj | Division address code word (b7, b6, b5, b4, b3, b2, b1, b0) |
|---|---|---|---|
| DN(1) | C1D1 | X1Y1 | (0, 0, 0, 1, 0, 0, 0, 1) |
| DN(2) | C1D2 | — | (0, 0, 0, 0, 0, 0, 0, 0) |
| DN(3) | C1D3 | — | (0, 0, 0, 0, 0, 0, 0, 0) |
| DN(4) | C1D4 | — | (0, 0, 0, 0, 0, 0, 0, 0) |
| DN(5) | C1D5 | — | (0, 0, 0, 0, 0, 0, 0, 0) |
| DN(6) | C1D6 | — | (0, 0, 0, 0, 0, 0, 0, 0) |
| DN(7) | C1D7 | — | (0, 0, 0, 0, 0, 0, 0, 0) |
| DN(8) | C1D8 | — | (0, 0, 0, 0, 0, 0, 0, 0) |

Then, the second user A2 drags and removes another virtual block image VB(1,2) from the first display region 31, and places the virtual block image VB(1,2) on the second display region 32 correspondingly. The display module in the region 32 links the position of the image M(1,2). At this time, the display module 10(1,2) at the physical address C1D2 has established a mapping relationship with the virtual block image VB(1,2) at the division address X1Y2, and the physical address C1 D2 is mapped to the division address X1Y2 with division address code word (0,0,0,1,0,0,1,0). The register of the storage circuit 310 is updated as Table 2-3:

TABLE 2-3

First chain channel CH(1)

| Chain node DN(j) | Physical address CiDj | Division address XiYj | Division address code word (b7, b6, b5, b4, b3, b2, b1, b0) |
|---|---|---|---|
| DN(1) | C1D1 | X1Y1 | (0, 0, 0, 1, 0, 0, 0, 1) |
| DN(2) | C1D2 | X1Y2 | (0, 0, 0, 1, 0, 0, 1, 0) |
| DN(3) | C1D3 | — | (0, 0, 0, 0, 0, 0, 0, 0) |
| DN(4) | C1D4 | — | (0, 0, 0, 0, 0, 0, 0, 0) |
| DN(5) | C1D5 | — | (0, 0, 0, 0, 0, 0, 0, 0) |
| DN(6) | C1D6 | — | (0, 0, 0, 0, 0, 0, 0, 0) |
| DN(7) | C1D7 | — | (0, 0, 0, 0, 0, 0, 0, 0) |
| DN(8) | C1D8 | — | (0, 0, 0, 0, 0, 0, 0, 0) |

Similarly, the second user A2 then drags and places another virtual block image VB(i,j) on the corresponding position of the display module connection image M(i,j). In one example, the virtual block images VB(i,j) may be dragged and placed sequentially according to the order of the division addresses XiYj. For example, in the first vertical column col1 of the first display region 31, the virtual block images VB(1,1), VB(1,2), VB(1,3), . . . , VB(1,7), VB(1,8) are dragged and dropped on positions of the display module connection images M(1,1), M(1,2), M (1,3), . . . , M(1,7), M(1,8). Next, in the second vertical column col2 of the first display region 31, the virtual block images VB(2,1), VB(2, 2), VB(2,3), . . . , VB(2,7), VB(2,8) are dragged and dropped on positions of the display module connection images M(2, 1), M(2,2), M (2,3), . . . , M(2,7), M(2,8). For simplicity, FIG. 5A only shows that, virtual block images VB(1,1), VB(1,2), VB(1,8), VB(2,7) and VB(2,8) are dragged and dropped on the display module connection images M(1,1), M(1,2), M(1,8), M(2,7) and M(2,8).

At this time, the display modules 10(1,1)-10(1,8) of the first chain channel CH(1) has established a mapping relationship with the virtual block images VB(1,1)-VB(1,8) of the division addresses X1Y1-X1Y8, and the register of the storage circuit 310 is updated as Table 2-4:

TABLE 2-4

First chain channel CH(1)

| Chain node DN(j) | Physical address CiDj | Division address XiYj | Division address code word (b7, b6, b5, b4, b3, b2, b1, b0) |
|---|---|---|---|
| DN(1) | C1D1 | X1Y1 | (0, 0, 0, 1, 0, 0, 0, 1) |
| DN(2) | C1D2 | X1Y2 | (0, 0, 0, 1, 0, 0, 1, 0) |
| DN(3) | C1D3 | X1Y3 | (0, 0, 0, 1, 0, 0, 1, 1) |
| DN(4) | C1D4 | X1Y4 | (0, 0, 0, 1, 0, 1, 0, 0) |
| DN(5) | C1D5 | X1Y5 | (0, 0, 0, 1, 0, 1, 0, 1) |
| DN(6) | C1D6 | X1Y6 | (0, 0, 0, 1, 0, 1, 1, 0) |
| DN(7) | C1D7 | X1Y7 | (0, 0, 0, 1, 0, 1, 1, 1) |
| DN(8) | C1D8 | X1Y8 | (0, 0, 0, 1, 1, 0, 0, 0) |

Moreover, the display modules 10(2,1)-10(2,8) of the second chain channel CH(2) also establishes a mapping relationship with the virtual block images VB(2,1)-VB(2,8) of division addresses X2Y1-X2Y8, which is stored in another register of the storage circuit 310, as shown in Table 2-5:

TABLE 2-5 second chain channel CH(2)

| Chain node DN(j) | Physical address CiDj | Division address XiYj | Division address code word (b7, b6, b5, b4, b3, b2, b1, b0) |
|---|---|---|---|
| DN(1) | C2D1 | X2Y1 | (0, 0, 1, 0, 0, 0, 0, 1) |
| DN(2) | C2D2 | X2Y2 | (0, 0, 1, 0, 0, 0, 1, 0) |
| DN(3) | C2D3 | X2Y3 | (0, 0, 1, 0, 0, 0, 1, 1) |
| DN(4) | C2D4 | X2Y4 | (0, 0, 1, 0, 0, 1, 0, 0) |
| DN(5) | C2D5 | X2Y5 | (0, 0, 1, 0, 0, 1, 0, 1) |
| DN(6) | C2D6 | X2Y6 | (0, 0, 1, 0, 0, 1, 1, 0) |
| DN(7) | C2D7 | X2Y7 | (0, 0, 1, 0, 0, 1, 1, 1) |
| DN(8) | C2D8 | X2Y8 | (0, 0, 1, 0, 1, 0, 0, 0) |

Furthermore, the processing device 300 synchronizes the updated values of the division address code words (b7, b6, b5, b4, b3, b2, b1, b0) stored in the register of the storage circuit 310 with that in the storage circuit 210, the microcontroller or the field programmable gate array of the host controller 200. Then, according to the updated values of the division address code words (b7, b6, b5, b4, b3, b2, b1, b0), the host controller 200 selects corresponding image output data from the image buffer (not shown in the figure) of the display system 1000, so as to control the display module 10(i,j) of the display wall 100 to display the physical segmentation image subP(i,j) correspondingly.

In another example, when dragging and dropping the virtual block image VB(i,j), the second user A2 may not follow the order of the division addresses XiYj, but may drag and drop in a random manner. For example, firstly, dragging and dropping the virtual block image VB(2,8) of the division address X2Y8 to the position of the display module connection image M(2,8), and then randomly place the virtual block image VB(1,8) of the division address X1Y2 to the position of display module connection image M(1,2), and so on.

As discussed above, the processing device 300 drags at least one of the virtual block images VB(i,j) from the first display region 31 to the second display region 32, so as to correspond to the display module connection image M(i,j), and the virtual block image VB(i,j) is correspondingly placed in the position of the display module connection image M(i,j) in the second display region 32. Accordingly, after the virtual block image VB(i,j) is dragged and placed on the second display region 32, the virtual block image VB(i,j) has a relationship with the display module connection image M(i,j). Moreover, the host controller 200 allocates the physical connection configuration of the display module 10(i,j) according to the relationship between the virtual block image VB(i,j) and the display module connection image M(i,j). Wherein, according to the relationship between the virtual block image VB(i,j) and the display module connection image M(i,j), the processing device 300 establishes mapping relation of the physical address CiDj and of the display module 10(i,j) and division address code words of the block image VB(i,j). Moreover, the host controller 200 allocates the physical connection configuration of the display module 10(i,j) according to the mapping relationship.

In other words, the second user A2 issues instructions to the host controller 200 through the control interface 30 of the processing device 300 (by sliding his hand on the control interface 30), causing the host controller 200 to control the display module 10 (i,j) to allocate the physical connection configuration in the display wall 100. For example, the physical connection configuration of the display module 10(i,j) is allocated as: 8 display modules 10(1,1)-10(1,8) with physical addresses C1D1-C1D8 are serially connected in the display wall 100 as first chain channel CH(1) of the daisy chain configuration. Furthermore, 8 display modules 10(2,1)-10(2,8) with physical addresses C2D1-C2D8 are serially connected in the display wall 100 as second chain channel CH(2) of the daisy chain configuration, etc.

Figure 5B:
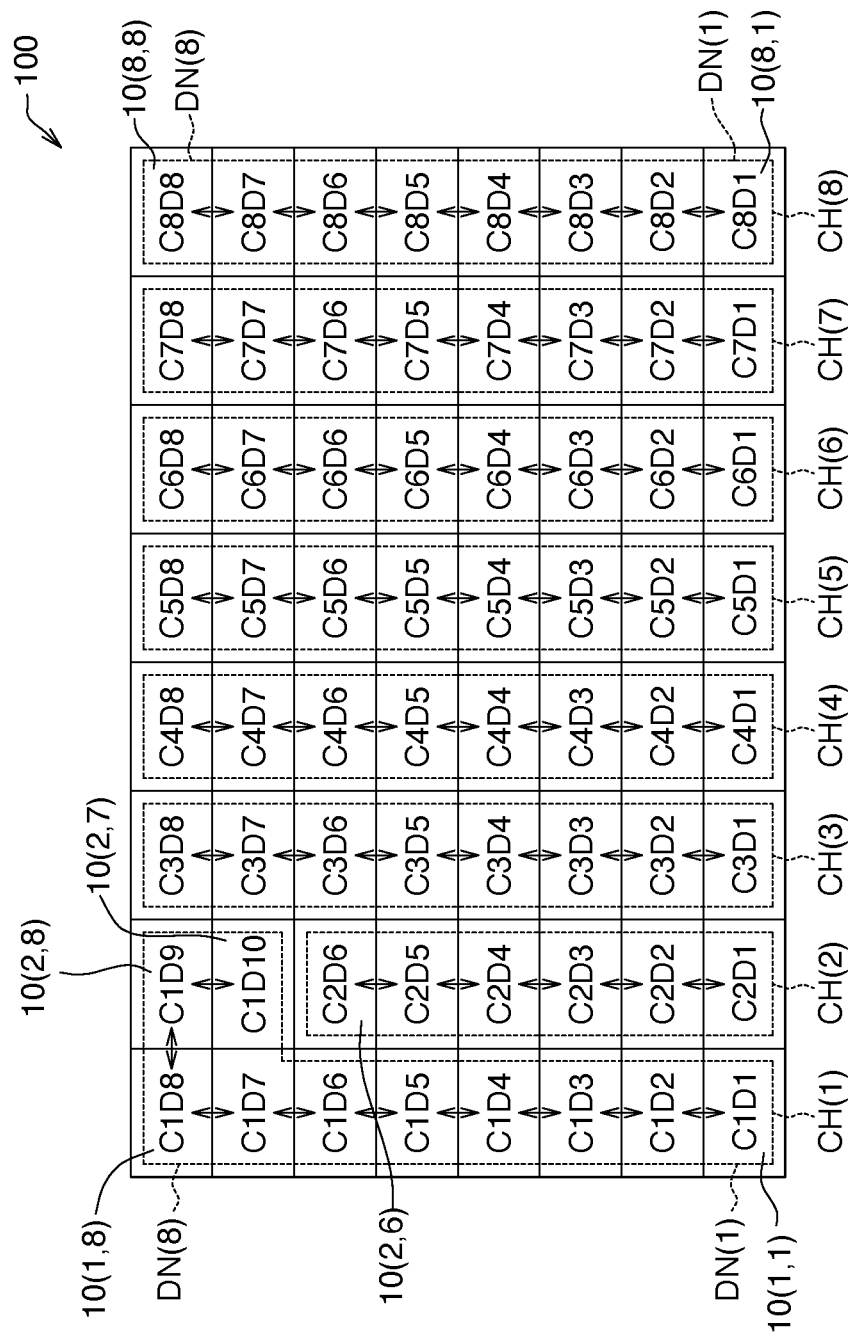
FIG. 5B is a schematic diagram showing the transformation of physical connection configuration of some of the display modules in the display wall.

FIG. 5B is a schematic diagram showing the transformation of physical connection configuration of some of the display modules 10(i j) in the display wall 100. Referring to FIG. 5B, when the uplink connection circuit of the display module 10(2,6) in the display wall 100 is abnormal, or the downlink connection circuit of the display module 10(2,7) is abnormal, that is, the display module 10(2,6) and the display modules 10(2,7) may not be serially connected with each other. In response to this situation, another adjacent display module 10(2,8) may be flexibly transformed to connect with the display module 10(1,8), so that the display module 10(2,7) and the display module 10(2,8) belongs to the first chain channel CH(1) to which display module 10(1,8) belongs. From the above, the physical connection configuration of the display module 10(2,7) and the display module 10(2,8) is changed, resulting in an increase in the amount of chain nodes of the first chain channel CH(1) (that is, increasing chain node DN(9) and chain node DN(10)), and the amount of chain nodes of the second chain channel CH(2) is reduced, forming an asymmetric connection configuration.

Figure 5C:
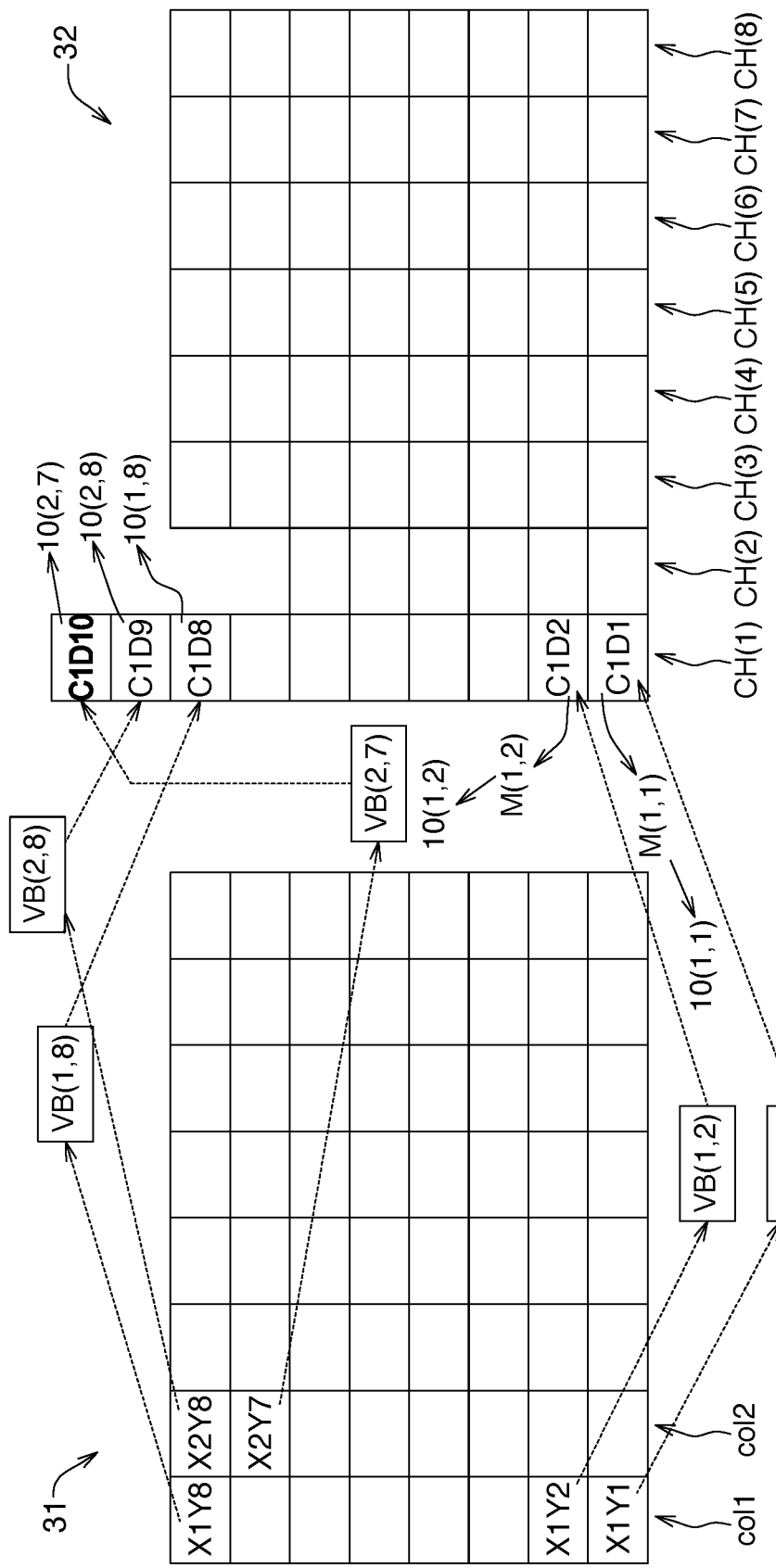
FIG. 5C is a schematic diagram showing another embodiment of dragging and dropping the virtual block image of the first display region to the second display region.

FIG. 5C is a schematic diagram showing another embodiment of dragging and dropping the virtual block image VB(i,j) of the first display region 31 to the second display region 32. The embodiment in FIG. 5C may be applied to physical connection configuration of FIG. 5B. As shown in FIG. 5C, the virtual block image VB(1,8) of the division address X1Y8 is dragged and dropped in the second display region 32, so as to correspond to the physical address C1 D8. Accordingly, a mapping relationship is established between the virtual block image VB(1,8) and the display module 10(1,8) at the physical address C1 D8, and the physical address C1 D8 is mapped to the division address code word (0,0,0,1,1,0,0,0) corresponding to the division address X1Y8.

Then, the virtual block image VB(2,8) of the division address X2Y8 is dragged and placed on the second display region 32 to correspond to the physical address C1 D9, and the physical address C1 D9 is mapped to the address code word (0,0,1,0,1,0,0,0) corresponding to the division address X2Y8. Next, the virtual block image VB(2,7) of division address X2Y7 is dragged and placed on the second display region 32 to correspond to the physical address C1D10, and the physical address C1 D10 is mapped to the division address code word (0,0,1,0,0,1,1,1) corresponding to the division address X2Y7.

Since the amount of chain nodes of the first chain channel CH(1) increases (that is, the chain node DN(9) and the chain node DN(10) are increased), the amount of registers of the storage circuit 310 needs to be increased. For example, increasing as 16 registers, so to store the mapping relationship of 10 nodes DN(1)-DN(10) of the chain channel CH(1), as shown in Table 3:

TABLE 3

First chain channel CH(1)

| Chain node DN(j) | Physical address CiDj | Division address XiYj | Division address code word (b7, b6, b5, b4, b3, b2, b1, b0) |
|---|---|---|---|
| DN(1) | C1D1 | X1Y1 | (0, 0, 0, 1, 0, 0, 0, 1) |
| DN(2) | C1D2 | X1Y2 | (0, 0, 0, 1, 0, 0, 1, 0) |
| DN(3) | C1D3 | — | (0, 0, 0, 0, 0, 0, 0, 0) |
| DN(4) | C1D4 | — | (0, 0, 0, 0, 0, 0, 0, 0) |
| DN(5) | C1D5 | — | (0, 0, 0, 0, 0, 0, 0, 0) |
| DN(6) | C1D6 | — | (0, 0, 0, 0, 0, 0, 0, 0) |
| DN(7) | C1D7 | — | (0, 0, 0, 0, 0, 0, 0, 0) |
| DN(8) | C1D8 | X1Y8 | (0, 0, 0, 1, 1, 0, 0, 0) |
| DN(9) | C1D9 | X2Y8 | (0, 0, 1, 0, 1, 0, 0, 0) |
| DN(10) | C1D10 | X2Y7 | (0, 0, 1, 0, 0, 1, 1, 1) |
| DN(11) | C1D11 | — | (0, 0, 0, 0, 0, 0, 0, 0) |
| DN(12) | C1D12 | — | (0, 0, 0, 0, 0, 0, 0, 0) |
| DN(13) | C1D13 | — | (0, 0, 0, 0, 0, 0, 0, 0) |
| DN(14) | C1D14 | — | (0, 0, 0, 0, 0, 0, 0, 0) |
| DN(15) | C1D15 | — | (0, 0, 0, 0, 0, 0, 0, 0) |
| DN(16) | C1D16 | — | (0, 0, 0, 0, 0, 0, 0, 0) |

On the other hand, the host controller 200 may detect the pitch between light-emitting elements in each display module 10(i,j) (for example, the pitch of the LED cells), and the host controller 200 calculates the second resolution Def2 of the display module 10(i,j) according to the pitch between light-emitting elements.

In one example, the control circuit board of the display module 10(i,j) has at least two cell identification pins (such as a pin "CELL_ID0" and a pin "CELL_ID1", not shown in the figure). These cell identification pins are used to define the pitch between the light emitting elements of the display module 10(i,j). The host controller 200 calculates the second resolution Def2 according to the pitch between the light-emitting elements defined by the cell recognition pins.

Moreover, the host controller 200 detects whether each display module 10(i, j) is normally installed on the display wall 100, and generates a detection result. Under normal installation conditions, each display module 10(i, j) of the display wall 100 should have the same second resolution Def2. When the host controller 200 calculates that: one display module 10(m,k) has a different second resolution Def2 (that is, the second resolutions Def2 of the display modules 10(m,k) is different from other display modules 10(i,j)), the detection result will indicate that: the display module 10(m,k) is determined to be abnormally installed.

If the detection result of the normal installation of the display module 10(m,k) is "No", when the second user A2 drags the virtual block image VB(i,j) to the second display region 32 on the control interface 30 to correspond to display module connection image M(i,j), the position of the display module connection image M(m,k) corresponding to the abnormally installed display module 10(*m,k*) does not place any virtual block images.

In another example, the control circuit board of the display module 10(*i,j*) has at least one slot detection pin (such as a pin "SLOT_DETn", not shown in the figure), and the slot detection pins are used to reflect whether the display module 10(*i,j*) exists in the display wall 100 or not. When the slot detection pins reflect that one display module 10(*o,p*) does not exist, the detection result is: the display module 10(*o,p*) is determined to be abnormally installed.

Figure 6A:
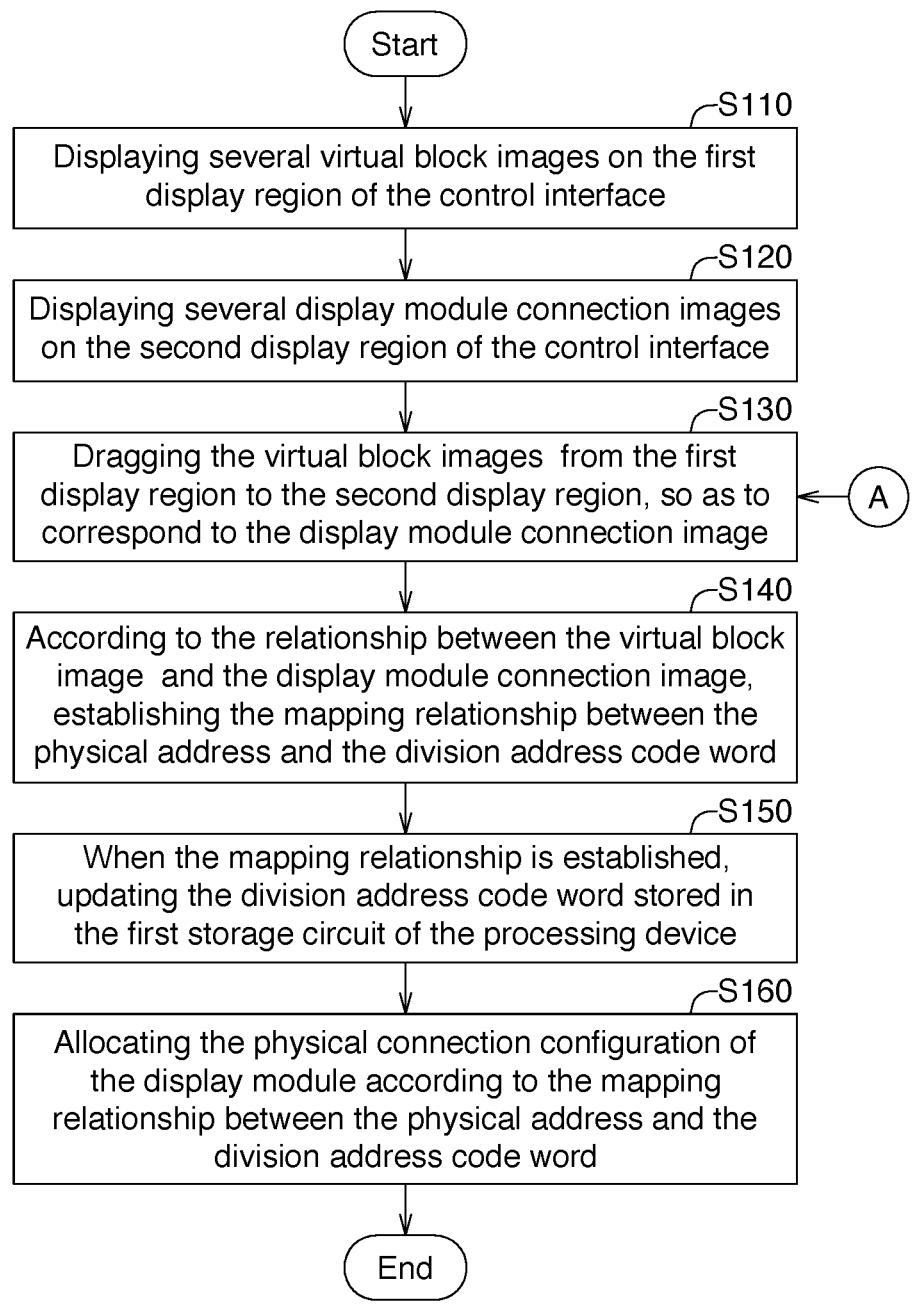
FIGS. 6A and 6B are flowcharts of an operating method of a display system according to an embodiment of the present disclosure.
Figure 6B:
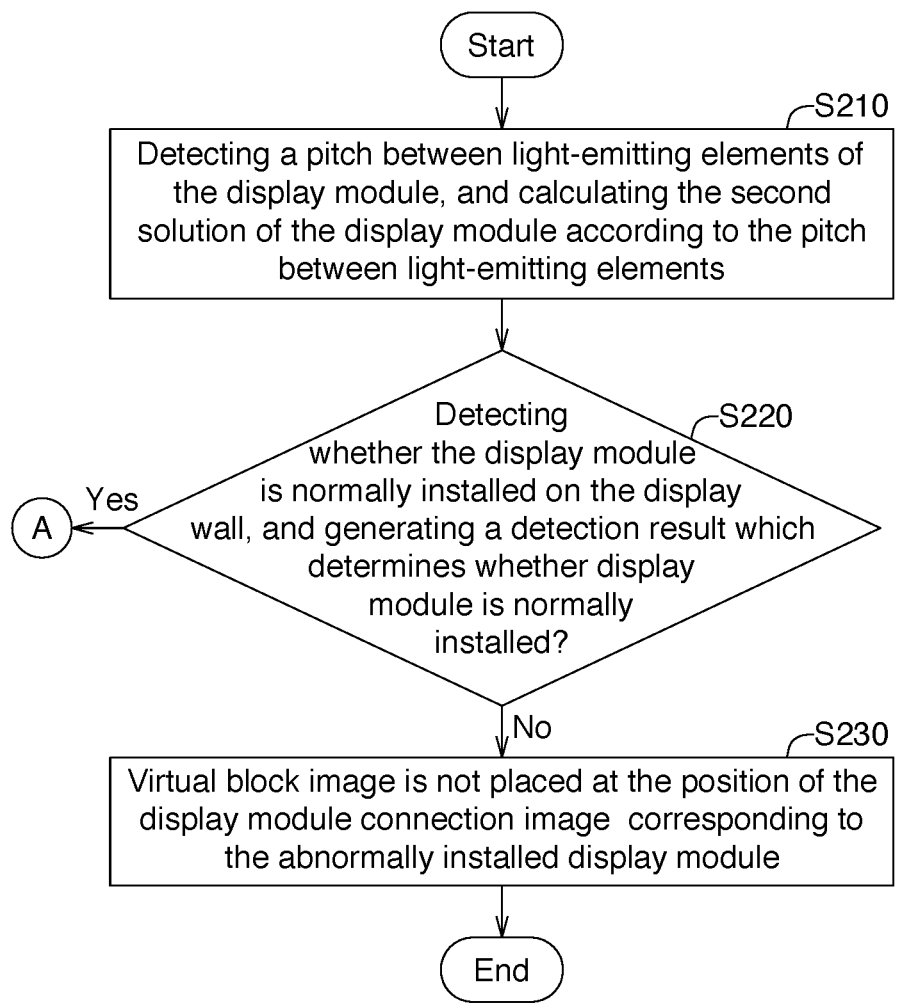

FIGS. 6A and 6B are flowcharts of an operating method of a display system according to an embodiment of the present disclosure. The operating method of this embodiment may be applied to the display system 1000 of embodiments shown in FIGS. 1 to 5C. Firstly, referring to FIG. 6A, in step S110, virtual block image VB(i,j) is displayed on the first display region 31 of the control interface 30 of the processing device 3000 of the display system 1000, and the virtual block image VB(i,j) corresponds to the physical segmentation image subP(i,j).

Then, in step S120, display module connection image M(i,j) is displayed on the second display region 32 of the control interface 30, and the display module connection image M(i, j) corresponds to the displayed Module 10(*i,j*). Then, in step S130, the virtual block image VB(i,j) is dragged from the first display region 31 to the second display region 32 to correspond to the display module connection image M(i,j), the virtual block image VB(i,j) is placed at a position in the second display region 32 corresponding to the display module connection image M(i,j).

Then, in step S140, according to the relationship between the virtual block image VB (i,j) and the display module connection image M(i,j), mapping relationship between the physical address CiBj of the display module 10(*i,j*) and the division address code word of the division address XiYj is established.

Then, in step S150, when the mapping relationship is established, the division address code word stored in the register of the first storage circuit 310 of the processing device 300 is updated. Then, in step S160, the physical connection configuration of the display module 10(*i,j*) is allocated according to the mapping relationship.

On the other hand, referring to FIG. 6B, in step S210, a pitch between light-emitting elements of the display module 10(*i, j*) is detected, and the second solution Def2 of the display module 10(*i,j*) is calculated according to the pitch between light-emitting elements. Then, in step S220, it is detected whether the display module 10 (*i,j*) is normally installed on the display wall 100, and a detection result is generated.

If the detection result of step S220 is "No", step S230 is excuted: in the second display region 32, virtual block image VB(i,j) is not placed at the position of the display module connection image M(m,k) corresponding to the abnormally installed display module 10(*m,k*).

If the detection result of step S220 is "Yes", step S130 of FIG. 6A is executed: in the second display region 32, the virtual block image VB(i,j) is correspondingly placed on at the position of the display module connection image M(i,j) corresponding to the normally installed display module 10(*i,j*).

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A display system for displaying a physical image, the physical image comprises a plurality of physical segmentation images, the display system comprising:
   a display wall, comprising a plurality of display modules, the display modules are used to correspondingly display the physical segmentation images, the display modules have a physical connection configuration in the display wall, and the physical connection configuration is related to a physical address of each of the display modules;
   a host controller, coupled to the display wall, and used to allocate the physical connection configuration of the display modules; and
   a processing device, coupled to the host controller, the processing device comprising:
      a control interface, comprising a first display region and a second display region, the first display region is used to display a plurality of virtual block images, the second display region is used to display a plurality of display module connection images, wherein the virtual block images have formats and contents consistent with the physical segmentation images and the display module connection images, and the virtual block images have same resolutions with the physical segmentation images, and the display module connection images respectively correspond to the display modules,
   wherein, the processing device is used to drag the virtual block images from the first display region to the second display region so as to correspond to the display module connection images, and the host controller is used to allocate the physical connection configuration of the display modules according to a relationship between the virtual block images and the display module connection images.

2. The display system according to claim 1, wherein, when the virtual block images are dragged from the first display region to the second display region to correspond to the display module connection images, the virtual block images are correspondingly located at positions of the display module connection images in the second display region.

3. The display system according to claim 1, wherein:
   each of the virtual block images has a division address, and the each division address is encoded into a division address code word, the physical addresses of the display modules have a mapping relationship with the division address code words of the virtual block images;
   the processing device establishes the mapping relationship according to the relationship between the virtual block images and the display module connection images; and
   the host controller allocates the physical connection configurations of the display modules according to the mapping relationship.

4. The display system according to claim 3, wherein, each of the virtual block images is located in a vertical column and a horizontal row of the first display region, the vertical column has a column code, and the horizontal row has a row code, the division address of each the virtual block image is related to the row code and the column code.

5. The display system according to claim 3, wherein, the processing device further comprises:
a first storage circuit, used to store the division address code words, and update the division address code words when the mapping relationship is established.

6. The display system according to claim 1, wherein, the physical connection configuration of the display modules forms a daisy chain configuration, and the physical connection configuration comprises a plurality of chain channels, and each the chain channel comprises a plurality of chain nodes, and each the display module corresponds to one of the chain channels and one of the chain nodes.

7. The display system according to claim 6, wherein, each of the chain channels has a chain channel code, each of the chain nodes has a chain node code, and the physical address of each of the display modules is related to the chain channel code and the chain node code.

8. The display system according to claim 6, wherein, each of the display module connection images corresponds to one of the chain channels and one of the chain nodes in the second display region.

9. The display system according to claim 6, wherein, when each of the chain channels comprises different amounts of the chain nodes, the physical connection configuration forms an asymmetric connection configuration.

10. The display system according to claim 1, wherein:
the amount of the physical segmentation images, the amount of the virtual block images, the amount of the display module connection images and the amount of the display modules are all equal to a first amount; and
the display wall and the physical image both have a first resolution, and each of the display modules, each of the physical segmentation images and each of the virtual block images all have a second resolution, and the first amount is equal to the first resolution divided by the second resolution.

11. The display system according to claim 10, wherein, the host controller detects a pitch between light-emitting elements of each of the display modules, and calculates the second resolution of each of the display modules according to the pitch between light-emitting elements.

12. The display system according to claim 11, wherein:
the host controller detects whether each of the display modules is normally installed on the display wall, and generates a detection result; and
when the virtual block images are dragged from the first display region to the second display region so as to correspond to the display module connection images and the detection result is "No", the virtual block images are not located at the positions of the display module connection images corresponding to the display modules which are abnormally installed.

13. The display system according to claim 12, wherein, when one of the display modules has the second resolution which is different, the display module is detected as abnormally installed.

14. An operation method of a display system, the display system is used to display a physical image, the physical image comprises a plurality of physical segmentation images, the display system comprises a display wall and a control interface, wherein the display wall comprises a plurality of display modules, the display modules are used to correspondingly display the physical segmentation images, the display modules have a physical connection configuration in the display wall, and the physical connection configuration is related to a physical address of each of the display modules, and the control interface comprises a first display region and a second display region, the operation method comprises the following steps:
displaying a plurality of virtual block images in the first display region, wherein the virtual block images have formats and contents consistent with the physical segmentation images and the display module connection images, and the virtual block images have same resolutions with the physical segmentation images;
displaying a plurality of display module connection images in the second display region, the display module connection images respectively correspond to the display modules;
dragging the virtual block images from the first display region to the second display region so as to correspond to the display module connection images; and
allocating the physical connection configuration of the display modules according to a relationship between the virtual block images and the display module connection images.

15. The operation method according to claim 14, wherein, when the virtual block images are dragged from the first display region to the second display region to correspond to the display module connection images, the virtual block images are correspondingly located at positions of the display module connection images in the second display region.

16. The operation method according to claim 14, wherein each of the virtual block images has a division address, and the each division address is encoded into a division address code word, the physical addresses of the display modules have a mapping relationship with the division address code words of the virtual block images, and the operation method further comprises:
establishing the mapping relationship according to the relationship between the virtual block images and the display module connection images; and
allocating the physical connection configurations of the display modules according to the mapping relationship.

17. The operation method according to claim 16, wherein, each of the virtual block images is located in a vertical column and a horizontal row of the first display region, the vertical column has a column code, and the horizontal row has a row code, the division address of each the virtual block image is related to the row code and the column code.

18. The operation method according to claim 16, wherein the display system further comprises a first storage circuit for storing the division address code words, and the operation method further comprises:
updating the division address code words when the mapping relationship is established.

19. The operation method according to claim 14, wherein, the physical connection configuration of the display modules forms a daisy chain configuration, and the physical connection configuration comprises a plurality of chain channels, and each the chain channel comprises a plurality of chain nodes, and each the display module corresponds to one of the chain channels and one of the chain nodes.

20. The operation method according to claim 19, wherein, each of the chain channels has a chain channel code, each of the chain nodes has a chain node code, and the physical address of each of the display modules is related to the chain channel code and the chain node code.

21. The operation method according to claim 19, wherein, each of the display module connection images corresponds to one of the chain channels and one of the chain nodes in the second display region.

22. The operation method according to claim 19, wherein, when each of the chain channels comprises different amounts of the chain nodes, the physical connection configuration forms an asymmetric connection configuration.

23. The operation method according to claim 14, wherein:
the amount of the physical segmentation images, the amount of the virtual block images, the amount of the display module connection images and the amount of the display modules are all equal to a first amount; and
the display wall and the physical image both have a first resolution, and each of the display modules, each of the physical segmentation images and each of the virtual block images all have a second resolution, and the first amount is equal to the first resolution divided by the second resolution.

24. The operation method according to claim 23, further comprising:
detecting a pitch between light-emitting elements of each of the display modules; and
calculating the second resolution of each of the display modules according to the pitch between light-emitting elements.

25. The operation method according to claim 24, further comprising:
detecting whether each of the display modules is normally installed on the display wall, and generates a detection result;
wherein, when the virtual block images are dragged from the first display region to the second display region so as to correspond to the display module connection images and the detection result is "No", the virtual block images are not located at the positions of the display module connection images corresponding to the display modules which are abnormally installed.

26. The operation method according to claim 25, wherein, when one of the display modules has the second resolution which is different, the display module is detected as abnormally installed.

* * * * *